Feb. 8, 1966    W. W. DOLLISON ETAL    3,233,860
BALL VALVE IMPROVEMENT
Filed April 16, 1962    2 Sheets-Sheet 2

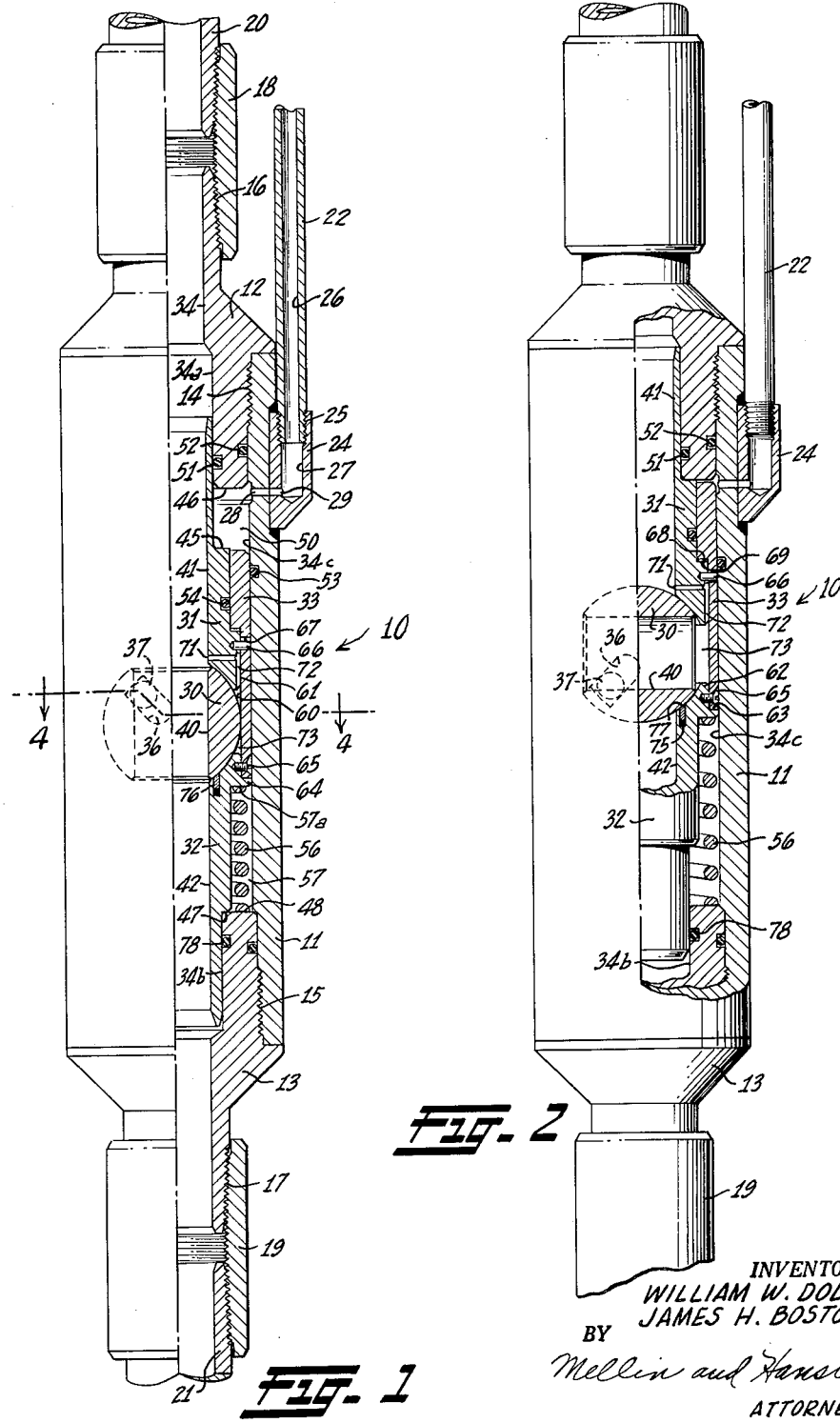

INVENTORS:
WILLIAM W. DOLLISON
JAMES H. BOSTOCK
BY
Mellin and Hanscom
ATTORNEYS

United States Patent Office 3,233,860
Patented Feb. 8, 1966

3,233,860
BALL VALVE IMPROVEMENT
William W. Dollison and James H. Bostock, Dallas, Tex., assignors to Otis Engineering Corporation, Dallas, Tex., a corporation of Delaware
Filed Apr. 16, 1962, Ser. No. 187,710
4 Claims. (Cl. 251—62)

This invention relates to ball valves and more particularly to an improved valving mechanism therefor.

One object of this invention is to provide an improved ball valve in which the friction between the ball member and its seats is reduced.

Another object of this invention is to provide an improved ball valve having limited relative motion between the seat members.

Still another object of this invention is to provide a ball valve which is more reliable and durable.

A still further object is to provide a ball valve in which only a portion of the operating forces is transmitted through the ball valve member.

Other objects and advantages will become apparent in the course of the following detailed description.

In the drawings, forming a part of this application, wherein like parts are designated by like numerals throughout the same:

FIG. 1 is a view, partly in elevation and partly in section, of a device constructed in accordance with the present invention showing the valve in its open position;

FIG. 2 is a view similar to FIG. 1 showing the valve in its closed position;

Figure 3:
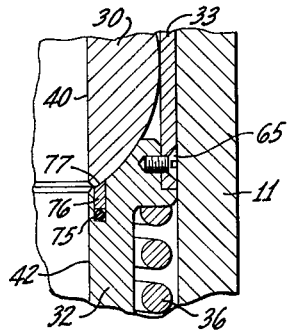
FIG. 3 is an enlarged view of a portion of FIG. 1, showing the details of the seal ring in the lower valve seat.

Referring now to FIG. 1, the first embodiment of this invention is generally indicated by the numeral 10, and comprises a tubular body 11 having upper and lower subs 12 and 13 fastened thereto as by threads 14 and 15, respectively. Upper and lower subs 12 and 13 are threaded as at 16 and 17 for attachment of couplings 18 and 19, respectively, by which the device is attached to the well flow string which may include joints 20 and 21. Subs 12 and 13 could be identical, if desired.

The device 10 is ideal for submarine well installations where it is made up in the well flow string and is located near the ocean floor, well below the surface of the water. It generally serves as a master valve and can be used in series where more than one master valve is required.

A hydraulic control line 22 extends from a surface control unit (not shown) to tubular body 11 where it is fastened to boss 24 as by thread 25 so that its bore 26 is in direct communication with bore 27 of the boss. Bore 27 of the boss 24 communicates with the interior of tubular body 11 through aligned lateral apertures 28 and 29 of the body and boss respectively. Boss 24 is welded to body 11 and is fluid tight.

A ball valve assembly, composed of ball valve member 30, a pair of downstream and upstream facing and spaced apart tubular valve seat members 31 and 32, is mounted in bore 34 of tubular body 11 for limited longitudinal movement. The downstream and upstream seats 31 and 32 are disposed in the downstream and upstream bore portions 34a and 34b and project into the enlarged bore portion 34c.

The exterior surface of the ball valve member 30 is formed with a pair of cam slots 36 in which transverse cam lugs or pins 37 engage. Thus, when the ball valve assembly moves longitudinally in body 11, the ball member 30 is forced to rotate about an axis transverse to the bore 40 therethrough, since the pins 37 are fixed to body 11.

The bore 40 is in alignment with bores 41 and 42 of the downstream and upstream seats when the ball valve assembly is in its lower, open position, as shown in FIG. 1. In this condition, well fluids may pass freely through the device. Similarly, when the ball valve assembly is in its upper position, as shown in FIG. 2, the bore 40 of the ball member 30 is out of alignment with the bores of the upper and lower seats, and fluid flow through the device is blocked.

Upward movement of the ball cage assembly is limited by the engagement of upwardly facing shoulder 45 of downstream seat 31 with the lower end 46 of the upper sub 12. The downward movement of the ball valve assembly is limited by the engagement of downwardly facing shoulder 47 of the upstream seat 32 with the upper end 48 of lower sub 13.

An annular variable capacity chamber 50 is formed between the downstream seat 31 and body 11 and between upper sub 12 and sleeve 33. This annular chamber 50 is made pressure tight by seal rings 51, 52, 53 and 54.

Fluid pressure passes downwardly through the flow passage formed by control line 22, boss bore 27, and aligned apertures 28 and 29 into chamber 50, where it applies a downward bias to the valve assembly.

The spring 56, in the annular chamber 57 between upstream seat 32 and body 11, bears against the upper end 48 of lower sub 13 and the downwardly facing shoulder 57a formed on seat 32 to bias the valve assembly upwardly in opposition to the bias of the fluid pressure in chamber 50.

In normal use of the valve the fluid pressure in the control line and chamber 50, is maintained at sufficient magnitude to maintain the valve assembly in its lowermost, open position, shown in FIG. 1, against the bias of spring 56. When the pressure in the control line is bled off, the spring forces the valve assembly to its upper, closed position, shown in FIG. 2.

In cases where this device is installed at a considerable distance beneath the surface of the water and a hydraulic fluid is used in the control line, the hydrostatic head of such control line liquid is quite appreciable and must be taken into account when selecting spring 56. That is, spring 56 must be sufficiently strong to operate the valve mechanism in spite of the hydrostatic pressure in chamber 50 and the added seal friction caused thereby.

In most ball valve arrangements, such as in U.S. Patent No. 2,973,005, issued to William W. Dollison and Phillip S. Sizer and entitled "Ball-Type Surface Safety Valve," where the ball valve mechanism moves longitudinally in its housing in order to effect rotation of the ball member between its open and closed positions, a spring or fluid pressure pushes one of the seats, which pushes on the ball, which pushes on the other seat, which opposes a resisting force. Thus, the ball member is squeezed between the two seats and tremendous friction is created. This extra friction not only requires extra power, but it causes excessive abrasion of the parts involved and usually scores the seating surfaces so badly that the valve leaks profusely. Of course, the abrasion roughens the parts and creates further friction which only adds to the abrasion. Before long, the leaky valve fails to operate at all. This is particularly true in installations where the well fluids produced through the valve have little or no lubricating qualities. In fact, many wells produce gas-distillate which is an effective solvent and tends to wash away any lubricant which may have been placed on the valve parts initially.

The improved ball valve mechanism of the present device differs from the well known types as will now be explained.

The downstream and upstream seats 31 and 32 are connected together by sleeve 33 which is tubular in shape and has a bore 60 of sufficient size to accommodate the enlarged outside diameter portion 61 of the downstream seat 31 and to pass freely over ball member 30. The lower end of sleeve bore 60 receives the upper reduced diameter portion 62 of the upstream seat. The lower end of the sleeve abuts the upwardly facing shoulder 63 provided by the external flange 64 of seat 32. Sleeve 33 is secured to seat 32 by any well known method such as screws 65.

Figure 4:
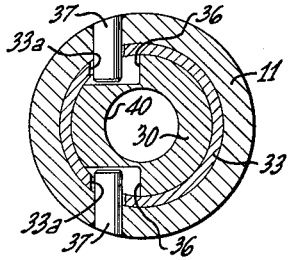
FIG. 4 is a cross-sectional view taken along line 4—4 of FIG. 1.

As shown in FIG. 4, sleeve 33 is provided with a pair of longitudinal slots 33a to accommodate transverse pins 37 since the sleeve moves longitudinally relative to housing 11 to which the pins are fixed.

The downstream seat 31 is provided with a pin 66 projecting outwardly through slot 67 (formed in sleeve 33) to prevent relative rotation between the sleeve and the seat while permitting slight relative longitudinal movement between them. Downward movement of seat 31 relative to sleeve 33 is limited by the engagement of the seat with ball valve member 30. Upward movement of seat 31, relative to the sleeve is limited by the engagement of upwardly facing external annular shoulder 68 of the seat with downwardly facing internal annular shoulder 69 of the sleeve.

It will be noted that seat 31 is not meant to seal against ball member 30, but is provided with a lateral aperture 71 and an intersecting external longitudinal slot 72 as shown to communicate bore 41 of seat 31 with chamber 73, formed between seats 31 and 32 exteriorly of the ball.

As best shown in FIG. 3, the upstream seat 32 can be provided with an annular groove in which O-ring 75 and seal ring 76 are disposed. Seal ring 76 is provided with a spherical seal surface 77 which is maintained in intimate contact with the outer surface of ball member 30 by the bias of resilient O-ring 75.

When the ball valve 30 is in the closed position as shown in FIG. 2, the upstream seat 32 seals against the ball. At this time, the well pressure acts directly on an area of the ball defined as that area sealed by seal ring 76, tending to push the ball against its downstream seat. Also, the well pressure acts directly on an annular area of the upstream seat defined as that area sealed by seal ring 78 minus the area sealed by seal ring 76, tending to push the upstream seat against the ball and, in turn, the ball against the downstream seat. These forces create friction which must be overcome in opening the valve. While the annular area of the upstream seat may seem small compared to the area of the ball sealed by seal ring 76, the friction resulting from the force of the pressure acting thereagainst is quite significant. At best, considerable friction is created by the forces on the ball member, and the force on the annular area of the upstream seat only tends to squeeze the ball between the seats, adding to the already high friction. Eliminating a part of this friction is a worthwhile thing since it makes possible a valve with a larger flow passage, smaller piston area, weaker operating spring, and operable at greater depths in water. Also, by reducing this friction, the ball and seats will wear longer.

In opening the valve, the ball valve mechanism is moved to its lower, open position against the bias of spring 56 and is held in that position by the bias of the fluid pressure in chamber 50. This fluid pressure acts across the annular area which is defined as the area sealed by seal ring 53 minus the area sealed by seal ring 51. In one embodiment of the invention which has been built, this annular area amounts to about 14 square inches. Although all of these 14 square inches are effective in opening the valve, not all of them are effective in squeezing the ball member between the two seats which would create excessive friction.

Fluid pressure in chamber 50 acts downwardly against the sleeve 33 and biases lower seat 32 downwardly relative to the ball valve member 30. The downward force exerted against the sleeve does not create friction between the ball member and its seats, but rather reduces the friction. In the device illustrated in FIGS. 1–4, the effective area of the sleeve 33 acted upon by the fluid pressure, i.e., the area sealed by seal ring 53 minus the area sealed by seal ring 54 amounts to approximately 9 square inches. The area of the upper seat acted upon the fluid pressure is that area defined as the area sealed by seal ring 54 minus the area sealed by seal ring 51 and amounts to about 5 square inches. Thus, of the 14 square inches acted upon by fluid pressure in chamber 50, nine of them act directly against the upstream seat, tending to push it ahead of the ball valve member.

Of course, the friction between the ball valve member and its seats could be further reduced merely by decreasing the area sealed by seal ring 54; however, in cases where the hydrostatic pressure of the liquid in control line 22 is very high, or if the hydrostatic head of the seat water should be very high and the control line 22 should break, an increase in the effective area of the sleeve would necessitate a corresponding increase in the load of spring 56, since the spring would have to overcome this hydrostatic pressure in order to move the ball valve mechanism to its closed position.

During the closing operation, spring 56 moves the ball valve mechanism upwardly and, here again, the ball member would be squeezed between its seat creating excessive friction were it not for the large effective area of sleeve 33. Thus, the spring pushes upwardly on seat 32 and this thrust is transmitted partly through the ball member and partly through the sleeve. Since the total area responsive to the fluid pressure of chamber 50 is about 14 square inches and the effective area of the sleeve is about 9 square inches, then about 9/14 of the power transmitted is transmitted through the sleeve and only 5/14 through the ball member. It can readily be seen, then, that the friction between the ball member and its seats is greatly reduced.

During the opening operation, it is possible that the upstream seat 32 may actually move away from ball member 30 a very short distance, limited by the engagement of shoulders 68 and 69 of downstream seat 31 and sleeve 33 as before explained. If so, seal ring 76 will remain in contact with the ball member due to the bias of resilient ring 75.

Thus, it has been shown that a new safety valve has been provided and that the operating friction of its ball valve member has been greatly reduced, thus increasing the durability and reliability of the device. It has been shown, too, that the friction can be further reduced in installations where the hydrostatic pressure exerted upon the walls of chamber 50 is not too great.

It should be understood that the invention is not limited to the embodiment shown. It is applicable to a wide variety of ball-type valves and especially those in which the ball valve member moves longitudinally of the flow passage as it rotates between its open and closed positions.

3. A ball-type safety valve as set forth in claim 1 and further including:
 means including a spring for biasing said first valve seat member for longitudinal movement in said bore away from said second valve seat member.

4. A ball-type safety valve as set forth in claim 3 and further including:
 second resilient means biasing said first and second valve seat members longitudinally together.

References Cited by the Examiner
UNITED STATES PATENTS

| | | | |
|---|---|---|---|
| 2,959,187 | 11/1960 | Boyle | 251—31 XR |
| 3,007,669 | 11/1961 | Fredd | 251—31 |
| 3,035,808 | 5/1962 | Knox | 251—62 |

MARTIN P. SCHWADRON, *Acting Primary Examiner.*
WILLIAM F. O'DEA, ISADOR WEIL, *Examiners.*

Figure 5:
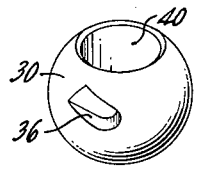
FIG. 5 is an isometric view of the ball valve member of the device of FIG. 1.

As an example, a second embodiment of the invention is illustrated in FIG. 5. This device is an improvement over a similar device which is disclosed in the above mentioned U.S. Patent 2,973,005.

This second embodiment is generally indicated by the numeral 100 in FIG. 5. The device is connectable in a flow conduit (not shown) as by flanges 101 and the connection made fluid tight by well known ring gaskets (not shown) which are received in ring grooves 102. It is understood that a screw connection could be used as well. Flow through the valve, as indicated by the arrow, is from left to right in the illustration.

Ball valve member 103 is disposed in bore 104 of the valve body 105 and between upstream and downstream seats 106 and 107 which are connected together by sleeve 108 in accordance with this invention.

The ball, together with its seats and connecting sleeve are longitudinally movable between a leftmost or open position and rightmost or closed position. The external surface of ball member 103 is provided with cam slots (not shown) which are similar to cam slots 36 of ball 30 of the first embodiment (FIGS. 1–4). They are engaged by transverse cam pins 110 in the same manner that transverse pins 37 engage slots 36 of the first embodiment. Thus, as ball 103 moves longitudinally between its open and closed positions, it is forced to also rotate about an axis transverse to the axis of its bore 111 so that in the open position its bore 111 is aligned with the bores 112 and 113 of the upstream and downstream seats and when in the closed position, its bore 111 is not aligned with the flow passage through the seats.

Fluid pressure from the flow conduit upstream of the device passes through flow passage 115 and 116 and passes around ball check 117 which is held off its seat 118 by a pilot valve (not shown) attached to the device by female thread 119. Fluid pressure then passes through flow passage 120 and into annular spring chamber 121 formed between the downstream seat and the wall of bore 104 of body 105 as shown. The pressure in variable capacity chamber 121 thus equals the pressure existing in the flow passage through the seats 106 and 107 and spring 122 maintains the valve mechanism in the open or leftmost position.

Should the pilot valve (not shown) which is attached to thread 119 operate, chamber 121 will be vented to atmosphere through passage 120 and, at the same time, ball check 117 will be permitted to go on seat 118 to prevent needless flow of fluids through passage 115, in a manner as fully illustrated and described in the above-mentioned U.S. Patent No. 2,973,005.

When chamber 121 is vented, the pressure therein decreases to atmospheric pressure, and the then higher pressure in the main flow passage of the valve, i.e., in and around the ball member 103, exerts a force to the right on valve parts 107 and 108 over an effective area equal to the area sealed by seal ring 125 minus the area sealed by seal ring 126. After ball valve member 103 has rotated sufficiently to pinch the flow therethrough, then the pressure differential begins to act across the ball member too as well as the upstream seat 106. This area is defined by the total area sealed by seal ring 128.

The valve will remain closed as long as these pressure forces offset the bias of spring 122.

The valve is opened by repressuring chamber 121, thereby permitting upstream pressure to act against the area sealed by O-ring 125 minus the area sealed by O-ring 126. (This area is about double the area sealed by O-ring 128.)

During opening of the valve, spring 122 forces sleeve 108 to its leftmost position, relative to downstream seat 107 where it is stopped by engagement of internal annular shoulder 130 of sleeve 108 with external annular shoulder 131 of downstream seat 107. This moves upstream seat 106 away from ball valve member 103 and prevents the ball member from being squeezed between the two seats. Thus, much friction between the ball member and its seats is prevented.

Figure 6:
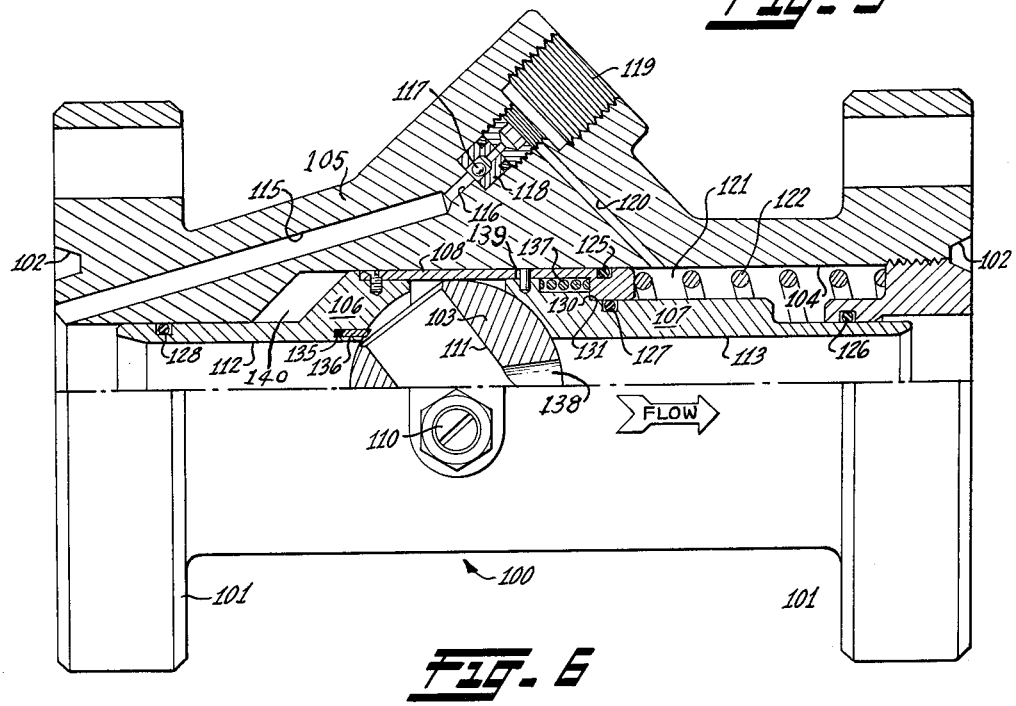
FIG. 6 is a view, partly in elevation and partly in section, showing a second embodiment of this invention with its ball valve member intermediate its open and closed positions.

Although the upstream seat 106 moves away from the ball member 103 for a limited distance, no flow of any consequence takes place immediately since resilient ring 135 biases seat ring 136 into contact with the ball member at all times. No flow will take place until the bore 111 of the ball 103 communicates with the bore 112 of upstream seat 106 about as shown in FIG. 6.

When spring 122 has moved upstream seat 106 to its leftmost position, then spring 137 forces downstream seat 107 further leftward to assure intimate contact between the ball and its seats. Inasmuch as the sleeve 108 is sealed to the valve body 105 by the O-ring 125, the internal pressure in the valve is exerted through ball valve passage 138, the lost motion slot 139 in the sleeve 108 and between the sleeve 108 and valve body 105 so that the area 140 in back of valve seat member 106 is at the same pressure as that existing in the main flow passage of the valve.

Thus, the devices illustrated and described fulfill all of the objects set forth earlier.

It is to be understood that the forms of the invention herein shown and described are to be taken as preferred embodiments of the same, and that various changes in the shape, size and arrangement of parts may be resorted to without departing from the spirit of the invention or the scope of the attached claims.

Having thus described our invention, what we claim and desire to secure by Letters Patent is:

1. A ball-type safety valve, comprising:
   a valve body provided with a bore therethrough having aligned first and second portions on either side of an enlarged diameter portion,
   first and second oppositely facing and spaced apart tubular valve seat members respectively longitudinally slidable in said first and second bore portions and having a part thereof projecting into said enlarged diameter bore portion,
   a ball-valve member having an opening therethrough and seatable between said seats for opening and closing said bore upon the rotation thereof about an axis transverse to the opening therethrough,
   interengaging cam slots on one and cam lugs on the other of the opposite sides of said ball-valve and said valve body for causing rotation of said ball-valve member to closed position upon longitudinal movement thereof in one direction in said bore and to open position upon longitudinal movement thereof in the opposite direction within said bore,
   an annular sleeve surrounding the second valve seat member, said sleeve being fixedly connected to the first valve seat member for unitary longitudinal movement therewith,
   interengaging means on said sleeve and said second valve seat member constructed and arranged to provide for slight movement apart of said valve seat members,
   means slidably sealing said sleeve to the enlarged diameter portion of the bore of said valve body and to said second valve seat member and slidably sealing said second valve seat member to said second bore portion of said valve body to form a variable capacity chamber bounded by said valve body, sleeve and second valve seat member,
   means forming a flow passage through said valve body into said chamber.

2. A ball-type safety valve as set forth in claim 1 and further including:
   means including a spring for biasing said first valve seat member for longitudinal movement in said bore towards said second valve seat member.